United States Patent [19]

Payne et al.

[11] 4,237,084

[45] Dec. 2, 1980

[54] METHOD OF PRODUCING INTERNAL BOUNDARY LAYER CERAMIC COMPOSITIONS

[75] Inventors: David A. Payne, Champaign; Sang M. Park, Urbana, both of Ill.; Otto C. Jahnke, El Cajon, Calif.

[73] Assignee: University of Illinois Foundation, Urbana, Ill.

[21] Appl. No.: 23,708

[22] Filed: Mar. 26, 1979

[51] Int. Cl.$^3$ .................. H01B 3/12; C04B 35/46; C04B 35/64
[52] U.S. Cl. .................. 264/61; 252/62.3 BT; 252/520; 252/521; 106/73.3
[58] Field of Search .............. 252/62.3 BT, 63.5, 520, 252/521; 106/73.3; 264/61

[56] References Cited

U.S. PATENT DOCUMENTS

| | | | |
|---|---|---|---|
| 3,933,668 | 1/1976 | Takahashi et al. | 106/73.3 X |
| 4,096,098 | 6/1978 | Umeya et al. | 252/62.3 BT X |
| 4,143,207 | 3/1979 | Itakura et al. | 252/520 X |
| 4,158,219 | 6/1979 | Payne et al. | 252/520 X |

*Primary Examiner*—Jack Cooper
*Attorney, Agent, or Firm*—Mathew L. Kalinowski

[57] ABSTRACT

An improved polycrystalline semiconducting ceramic composition comprises an alkaline earth metal titanate doped with a hexavalent metal oxide such as $(MO_3)$-$(Bi_2O_3)_x$ where M is tungsten or molybdenum, and x ranges from 0 to 7, which is liquid phase sintered with lead germanate to produce internal insulating boundaries. The composition is fine grained and provides thin-layer, multi-layer capacitors that exhibit high dielectric constant values, low dissipation factors, and low temperature and voltage coefficients of capacitance.

5 Claims, 1 Drawing Figure

METHOD OF PRODUCING INTERNAL BOUNDARY LAYER CERAMIC COMPOSITIONS

This invention relates to polycrystalline semiconducting ceramic compositions having internal insulated grain boundaries, to methods for producing such compositions, and to capacitors utilizing such compositions as a dielectric.

Ceramic compositions having internal insulated grain boundaries are known in the art. For example, compositions based on barium titanate having a perovskite lattice doped with $Sb_2O_3$ to provide n-type conductivity and with CuO to provide p-type conductivity are disclosed in Brauer, et al., U.S. Pat. No. 3,569,802, which patent is incorporated herein by reference as illustrative of the state of the art. Such compositions have grain sizes in the range of about 20–300 microns and have a high dielectric constant value; however, because they are based on a ferroelectric material, they exhibit the usual Curie-Weiss temperature dependence with as high as ±80% change in capacitance over a temperature range of −30 to 85° C., and a saturation of dielectric constant with voltage.

A somewhat more stable polycrystalline semiconducting ceramic composition can be produced by sintering strontium titanate with a small amount of $Nb_2O_5$ or $Ta_2O_5$ and a small amount of $GeO_2$ or ZnO. The internal grain boundaries are insulated by diffusing therein $Bi_2O_3$ or a mixture of $Bi_2O_3$, PbO, and $B_2O_3$ from the surface of a pellet. Such compositions are disclosed in Takahashi, et al., U.S. Pat. No. 3,933,668 which patent is incorporated herein by reference as illustrative of the art relating to strontium titanate ceramics. These compositions typically exhibit high dielectric constant values, temperature coefficients of capacitance in the neighborhood of ±15%, and grain sizes greater than 25 microns.

Although the above-described semiconducting ceramic compositions having internal insulating boundaries provide high dielectric constant values, they are limited in their application because of their relatively high temperature and voltage coefficients of capacitance, and their large grain sizes; further, they cannot be successfully fabricated into thin-layer, multi-layer devices.

Accordingly, it is an object of this invention to provide polycrystalline semiconducting ceramic compositions having internal insulated grain boundaries that exhibit high dielectric constant values, low dissipation factors, and low temperature and voltage coefficients of capacitance.

Another object of this invention is to produce fine-grained ceramics suitable for the fabrication of thin-layer, multi-layer capacitors.

A further object of this invention is to provide a process in which the internal insulating grain bounderies are produced by liquid phase sintering with lead germanate at temperatures well below those required in prior art diffusion processes.

These and other objects will become apparent as description of the invention proceeds.

SUMMARY OF THE INVENTION

Figure 1:
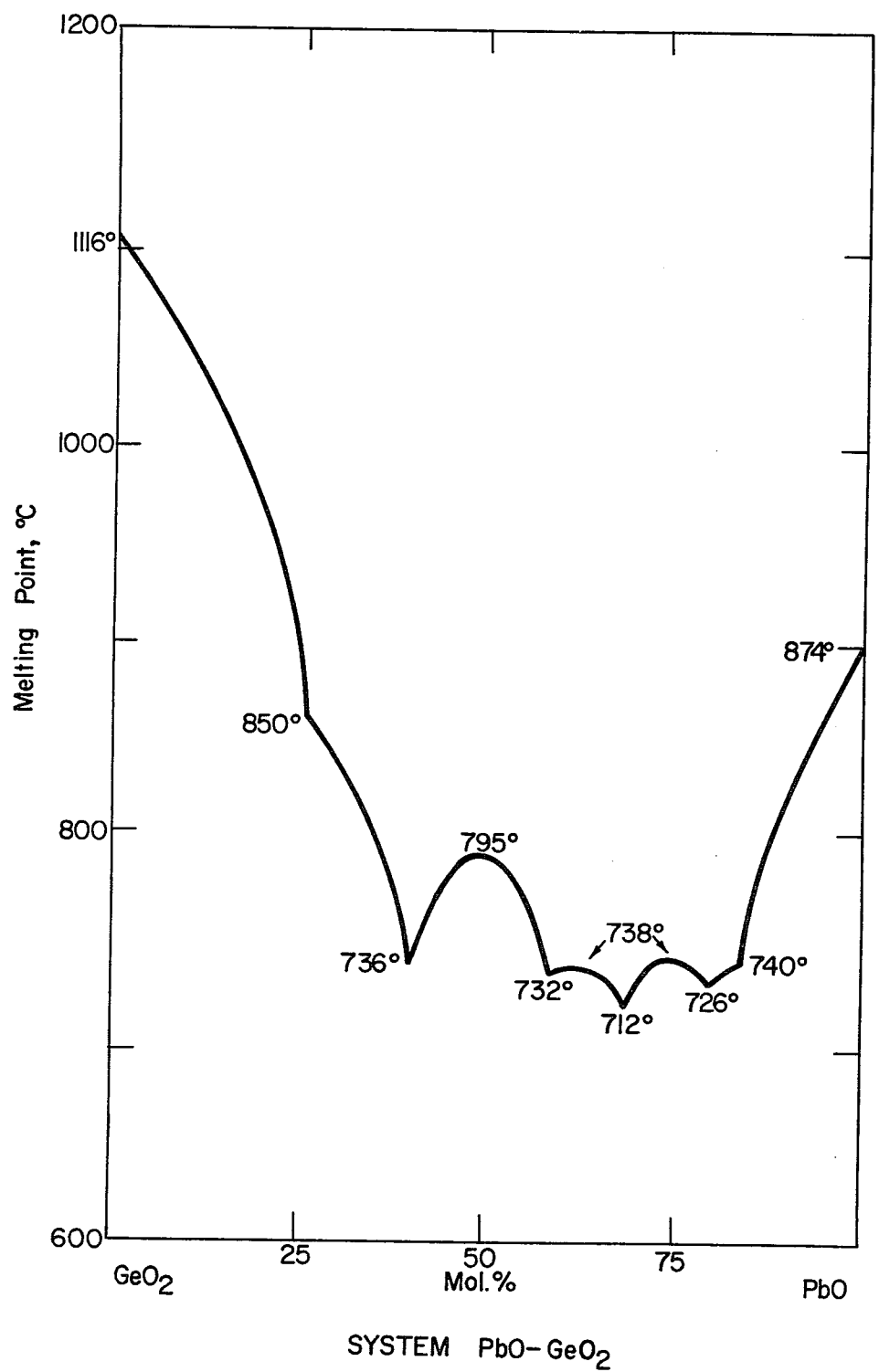
FIG. 1 is a phase diagram of the PbO-$GeO_2$ system showing the melting points of various lead germanate compositions.

The semiconducting ceramic compositions of this invention comprise a major amount of a polycrystalline alkaline earth metal titanate doped with a small amount of a metal oxide capable of providing n-type semiconductivity and a minor amount of a lead germanate composition. The term "lead germanate" in this specification is meant to include lead and germanium containing compounds such as $Pb_5Ge_3O_{11}$, and lead, germanium, and silicon containing compounds defined by the formula

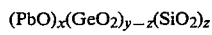

where x ranges from 1 to 6, y ranges from 1 to 3, and z ranges from 0.0 to 0.75y. Mixtures of two or more compositions can also be used.

The ceramic compositions are characterized in that the lead germanate composition is incorporated therein by liquid phase sintering which provides an insulating boundary layer about the grains of the polycrystalline semiconducting alkaline earth metal titanate.

Suitable alkaline earth metal titanates possess a perovskite lattice structure and comprise strontium titanate, barium titanate, calcium titanate, and mixtures thereof. Strontium titanate is the preferred material and can be obtained from mixtures of SrO and $TiO_2$, $SrCO_3$ and $TiO_2$, and from other sources well known in the art.

The metal oxide providing n-type semiconductivity is suitably a hexavalent metal oxide having the formula

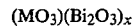

where M is tungsten (W) or molybdenum (Mo), and x ranges from 0 to 7. Materials that afford $WO_3$ or $MoO_3$ during calcination can be used to advantage; examples of such materials are the acids $H_2WO_4$ and $H_2MoO_4$ and salts thereof.

Lead germanate compositions suitable for the liquid phase sintering step can be prepared by heating various mixtures of PbO and $GeO_2$ up to temperatures of about 1000° C. The phase diagram in FIG. 1 shows the melting points for various molar ratios of PbO and $GeO_2$. For the purpose of this invention, lead germanate compositions having melting points below about 850° C. are preferred. Because of the relatively high cost of $GeO_2$ a portion of it can be replaced advantageously with $SiO_2$.

The lead germanate composition having the formula $Pb_5Ge_3O_{11}$ is a preferred composition because it melts congruently (i.e., solid and liquid phases have identical compositions) to provide a low viscosity melt which permits rapid and complete liquid phase sintering at temperatures as low as 850° C. The composition is prepared by heating a mixture of 5 moles of PbO and 3 moles of $GeO_2$ in a platinum crucible at 800° C. The cooled product, having the formula $Pb_5Ge_3O_{11}$, is crushed and powdered in a mortar and pestle, screened through a 325 mesh screen, and further reduced by ball milling. The final powder has a particle size ranging between about 0.5 and 30 microns with the greatest concentration at about 5 microns.

DESCRIPTION OF THE PREFERRED EMBODIMENTS

The ceramic compositions of this invention are produced by the steps of calcining fine particle size alkaline earth metal titanate, or a mixture of alkaline earth oxide or carbonate with $TiO_2$, with a small amount of the hexavalent metal oxide disclosed above to produce n-type semiconductivity; milling and blending the powder with the lead germanate composition disclosed above; and pressing and firing the mixture in air or a reducing atmosphere to produce internal insulating boundary layers about the grains of the semiconducting titanate by liquid phase sintering.

Generally from about 90 to about 99.99, preferably from about 95 to about 99% by weight of the alkaline earth metal titanate is calcined with generally from about 0.01 to about 10, preferably from about 1 to about 5% by weight of the hexavalent metal oxide in air or a reducing atmosphere to produce n-type semiconductivity. Calcination is conveniently carried out at a temperature of about 1000 to about 1400° C. for about 1 to about 4 hours in a weakly reducing atmosphere, for example a forming gas containing about 10% of hydrogen. The resulting powder is milled and blended with generally from about 0.01 to about 35, preferably from about 1 to about 10% by weight of the lead germanate composition, and is then pressed and fired to provide, by liquid phase sintering, internal insulating boundary layers about the grains of the metal titanate. The liquid phase sintering step is conveniently carried out at a temperature in the range of from about 850 to about 1300° C. for from about 1 to about 60 minutes in air or a weakly reducing atmosphere. A fine-grained microstructure exhibiting a grain size of about 2 microns is obtained which is highly suited to the production of thin-layer, multi-layer capacitors having excellent dielectric properties.

The invention is further illustrated by reference to the following procedures and examples.

EXAMPLE 1

Fine particle size strontium titanate (1 micron) was reduced by calcining with 2% by weight of $WO_3$ in a 10% hydrogen atmosphere at 1380° C. for 4 hours to produce an n-type semiconductor. To the resulting powder was added 5% by weight of $Pb_5Ge_3O_{11}$, the mixture was milled and blended, and then pressed into discs (1 cm in diameter, 0.5 mm thick) and fired at 1200° C. for 30 minutes to produce internal insulating boundary layers about the strontium titanate grains by liquid phase sintering. The discs were electroded with fritted silver paste and fired in air at 800° C. for 5 minutes.

Dielectric constant (K) and dissipation factor (DF) were recorded at 100 KHz and 0.5 volts AC. The voltage coefficient of capacitance (VC) was measured at 200 volts DC. The temperature coefficient of capacitance (TC) was measured over the temperature range of $-55$ to $+125°$ C.

Typical values found for the capacitors prepared in this example were: k = 5,000–10,000; DF = 3% max.; VC = $-5\%$ max.; TC = $\pm 5\%$ max.

EXAMPLE 2

Fine particle size strontium titanate (1 micron) was reduced by calcining with 2% by weight of $Bi_2WO_6$ in a 10% hydrogen atmosphere at 1200° C. for 2 hours to produce an n-type semiconductor. To the resulting powder was added 5% by weight of $Pb_5Ge_3O_{11}$, the mixture was milled and blended, and then pressed into discs (1 cm in diameter, 0.5 mm thick) and fired at 1200° C. for 30 minutes to produce internal insulating boundary layers by liquid phase sintering. The discs were electroded with fritted silver paste and fired in air at 800° C. for 5 minutes.

Typical values found for capacitors prepared in this example were: K = 5,000–10,000; DF = 3% max.; VC = $-5\%$ max.; TC = $\pm 5\%$ max.

It is clear that a stabilized high dielectric constant ceramic composition having internal insulated boundary layers can be produced from the herein disclosed components by a liquid phase sintering technique using the herein disclosed lead germanate composition. Electrical propertis of the capacitors fabricated from the inventive ceramic composition such as dielectric constant, dissipation factor, voltage and temperature coefficients of capacitance, appear exceedingly attractive for various applications including high capacitance, low voltage markets and thin-layer, multi-layer devices.

Although this invention has been disclosed with particular reference to certain preferred embodiments thereof, it is understood that variations and modifications can be effected within the spirit and scope of the appended claims. It is intended that all matter contained in the above description or shown in the accompanying drawing shall be interpreted in an illustrative and not in a limiting sense.

What is claimed is:

1. A method of producing a fine-grained ceramic composition comprising the steps of:
    (a) calcining at a temperature of about 1000–1400° C. about 90–99.99% by weight of a fine particle size polycrystalline alkaline earth metal titanate with about 0.01 to 10% by weight of a hexavalent metal oxide having the formula $(MO_3)(Bi_2O_3)_x$, where M is tungsten or molybdenum and x is 0.0–7, whereby said titanate is rendered semiconducting;
    (b) mixing the product of step (a) with about 0.01–35% by weight of a lead germanate composition having the formula $(PbO)_x(GeO_2)_{y-z}(SiO_2)_z$, where x is 1–6, y is 1–3, and z is 0.0–0.75y; and
    (c) firing the mixture of step (b) at a temperature of about 850–1300° C. to provide by liquid-phase sintering an insulating boundary layer of said lead germanate composition about the grains of said semiconducting alkaline earth metal titanate.

2. The method of claim 1 wherein said alkaline earth metal titanate is strontium titanate.

3. The method of claim 2 wherein said lead germanate composition is $Pb_5Ge_3O_{11}$.

4. The method of claim 3 wherein said metal oxide is $WO_3$.

5. The method of claim 3 wherein said metal oxide is $Bi_2WO_6$.

* * * * *